United States Patent
Akrout et al.

(10) Patent No.: US 6,785,841 B2
(45) Date of Patent: Aug. 31, 2004

(54) PROCESSOR WITH REDUNDANT LOGIC

(75) Inventors: Chekib Akrout, Austin, TX (US);
Harm Peter Hofstee, Austin, TX (US);
James Allan Kahle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 571 days.

(21) Appl. No.: 09/734,371

(22) Filed: Dec. 14, 2000

(65) Prior Publication Data

US 2003/0115500 A1 Jun. 19, 2003

(51) Int. Cl.[7] .................................................. G06F 11/00
(52) U.S. Cl. ............................ 714/11; 714/10; 714/13; 711/125; 711/169
(58) Field of Search ........................... 714/10, 11, 13; 711/125, 169

(56) References Cited

U.S. PATENT DOCUMENTS 5,815,651 A * 9/1998 Litt .............................. 714/10
6,173,416 B1 * 1/2001 Liddell et al. ................ 714/11
6,435,712 B1 * 8/2002 Ota .............................. 714/12

* cited by examiner

Primary Examiner—Nadeem Iqbal
Assistant Examiner—Christopher Euripidou
(74) Attorney, Agent, or Firm—Joseph P. Lally; Casimer K. Salys

(57) ABSTRACT

A system including a central processor and a plurality of attached processors all on a single die are disclosed. Each of the attached processors is preferably functionally equivalent to each of the other attached processors. The system further includes at least one redundant processor that is connectable to the central processor. The redundant processor may be substantially equivalent to each of the attached processors. Upon detecting a failure in one of the attached processors, the system is configured to disable the non-functional processor and enable the redundant processor. The attached processors may be connected to a memory interface unit via a parallel bus or a pipelined bus in which each attached processor is connected to a stage of the pipelined bus. The attached processors may each include a load/store unit and logic suitable for performing a mathematical function.

18 Claims, 2 Drawing Sheets

PROCESSOR WITH REDUNDANT LOGIC

BACKGROUND

1. Field of the Present Invention

The present invention is related to the field of semiconductor devices and more particularly to a microprocessor device that incorporates redundant circuitry suitable for replacing defective portions of the processor.

2. History of Related Art

In the field of semiconductor devices, manufacturing yield is a critical factor determining the profitability of a particular device. Manufacturing yield refers to the percentage of die on a wafer that are fully functional. Typically the yield of a given device or technology is a strong function of particle count in the fabrication facility. Particles may produce tiny defects in one or more layers of the device. As the particle count increases, the manufacturing yield drops correspondingly.

Typically, the defects caused by particles are extremely localized. A particle may, for example, result in a tiny short circuit between adjacent metal lines. In such cases, the vast majority of the device is free of defects and fully functional. In the absence of the ability to correct or circumvent the failure caused by the defect, however, the device is non-functional.

Manufacturers have attempted to improve yield through the use of redundancy. Redundancy refers to the practice of designing spare circuits or features designed into a semiconductor device or integrated circuit. Under appropriate circumstances, the redundant feature or features may replace a similar feature in the device to produce a fully functional device.

Redundancy is most commonly associated with integrated circuits that include large sections of highly repetitive circuitry. As an example, memory devices, which typically include a large array of memory cells arranged as a series of rows and columns, are ideally suited for beneficially implementing redundant elements. Spare rows and columns are designed into the device. If the device is fully functional, the spare rows and columns are not used. If one or more rows and columns are defective, the defective elements may be disabled and the spare elements enabled to provide functionally equivalent substitutes.

Although redundancy has been used advantageously in semiconductor memories, it has not been as successfully implemented in logic devices such as microprocessors. Processors characteristically include a number of distinct functional elements that lack the symmetry and homogeneity of a memory cell array. While entire functional elements could be replicated to provide redundant capability, the resulting increase in die size would substantially offset the benefit provided.

As an example, most processors include one or more load/store units that enable the processor to retrieve information from and store information to memory. The load/store unit design is distinct from the design of other functional units such as a fixed point arithmetic unit, a floating point unit, or a branch unit. While a redundant load/store unit could be included in the design of a processor, the processor die size would increase substantially thereby reducing the number of devices on a wafer. Moreover, the utility of the redundant load/store unit is significantly limited. More specifically, the redundant load/store unit is only beneficial when the original load/store unit is the functional unit that prevents the device from being fully functional. If the load/store unit occupies 20% or less of the device, the probability that a device with a single, randomly located defect is repairable may not justify the inclusion of the redundant element in the design.

Thus, for conventionally designed processor chips, redundancy has typically not been used with great success. It would be desirable, therefore, to design a processor device with cost effective redundant elements.

SUMMARY OF THE INVENTION

The problem identified above is in large part addressed by a system that includes a central processor and a plurality of attached processors. In one embodiment, the central processor may comprise a general purpose CPU and each of the attached processors provides support functions for the CPU. Each of the attached processors may comprise a single instruction multiple data (SIMD) processor such as a vector processor or an array processor. Each of the attached processors is preferably functionally equivalent to each of the other attached processors. The system further includes at least one redundant processor that is connectable to the central processor. The redundant processor may be identical or substantially equivalent to each of the attached processors. In one embodiment, each of the attached processors is associated with an attached processor ID. Attached processor instructions may include ID information that is used to execute each attached processor instruction selectively in the appropriate attached processor. The attached processor ID may be specified in a programmable ID register of each of the attached processor. Upon detecting a failure in one of the attached processors, the system is configured to disable the non-functional processor and enable the redundant processor. Disabling the non-functional processor may include altering the information in the attached processor ID register while enabling the redundant processor may include programming the processor ID of the redundant processor to the value of the non-functional processor. Disabling the non-functional attached processor may further include electrically disconnecting the attached processor such as by destroying one or more fuseable links.

BRIEF DESCRIPTION OF THE DRAWINGS

Other objects and advantages of the invention will become apparent upon reading the following detailed description and upon reference to the accompanying drawings in which.

Figure 1:
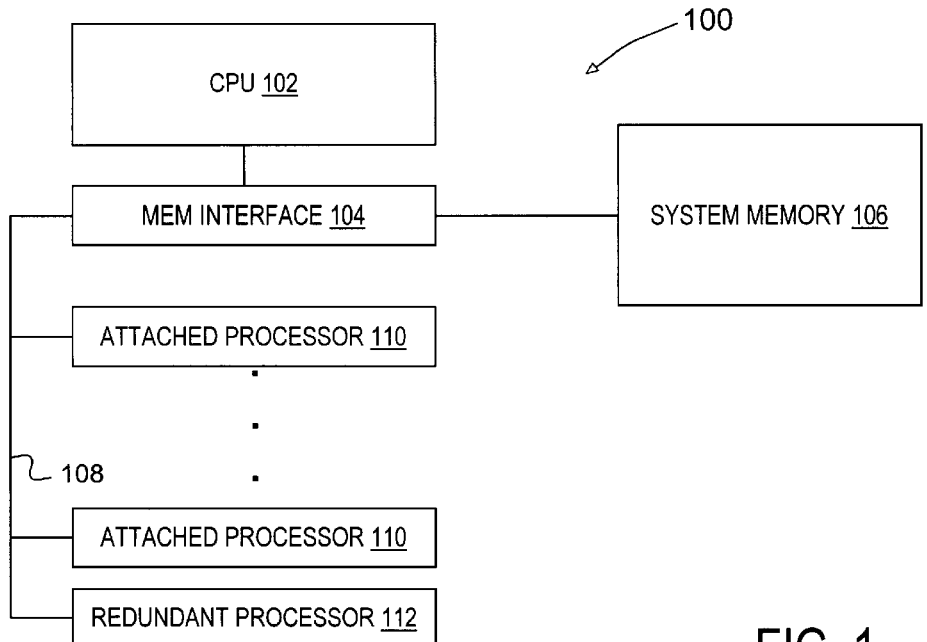
FIG. 1 is a block diagram of a data processing system according to one embodiment of the invention including a central processing unit and a set of attached processors.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Generally speaking, the present invention contemplates implementing redundancy in a logic device such as a processor by incorporating a redundant element that is substantially equivalent to a portion of the processor. The system may include a set of functionally equivalent co-processors or attached processors. The set of attached processors may occupy a significant portion of the system while each attached processor consumes a relatively small portion. In this embodiment, the redundant element may comprise a functional equivalent of one of the attached processors. When one of the attached processors is determined to be non-functional, the non-functional processor is disabled and the redundant processor is enabled to replace the non-functional processor. In this manner, the system includes a cost effective redundancy scheme by incorporating a redundant element that does not add significantly to the die size, but is suitable for repairing a significant percentage of defective devices.

Turning now to the drawings, FIG. 1 is a block diagram of a data processing system 100 according to one embodiment of the present invention. The components of data processing system 100, with the possible exception of system memory 106, are preferably fabricated as a single chip device in which each component is fabricated on the same integrated circuit die. As depicted, system 100 includes a central processor (CPU) 102 that accesses a system memory 106 via a memory interface unit 104. CPU 102 may be implemented as a general purpose microprocessor such as a PowerPC® type processor from IBM Corporation. Alternatively, CPU 102 may comprise a proprietary or application specific processor depending upon the implementation.

System 100 further includes a set of attached processors 110 and a redundant processor 112 that are connected to memory interface unit 104 via a memory access bus 108. Each attached processor 110 may have direct memory access (DMA) capability via memory interface 104. Typically, each attached processor 110 is designed to provide support functionality for CPU 102. CPU 102 is typically capable of performing address translation and is configured to issue precise interrupts whereas these features might be lacking in attached processors 110.

In one embodiment, for example, each attached processor may comprise a single instruction multiple data (SIMD) processor that is optimized to perform specialized tasks. In an SIMD processor, high-level operations, invoked by a single instruction, are performed on linear arrays of numbers referred to as vectors. A vector operation might, for example, add two 64-entry, floating-point vectors to obtain a single 64-entry vector. The vector instruction may be the functional equivalent of an entire DO loop, in which each iteration of the DO loop includes computing one of the 64 elements of the result, updating the loop indices, and branching back to the beginning of the DO loop. Vector processors are described in greater detail in, J. L. Hennessy and D. A. Patterson, *Computer Architecture a Quantitative Approach, Second Edition*, Appendix B (Morgan Kaufmann 1996). Vector processors typically include deep pipelines that increase the effective number of instructions that are executed in each cycle. Another advantage of vector processors is that a single vector instruction may specify a large amount of computational work. Such a single vector instruction may be equivalent to executing an entire DO loop. Thus, the instruction bandwidth requirement of the CPU is reduced. Because of these advantages, vector operations may be executed faster than a sequence of scalar operations on the same number of data elements. Vector processors and other SIMD processors such as array processors are widely used to provide support functionality to general purpose processors such as CPU 102.

Figure 2:
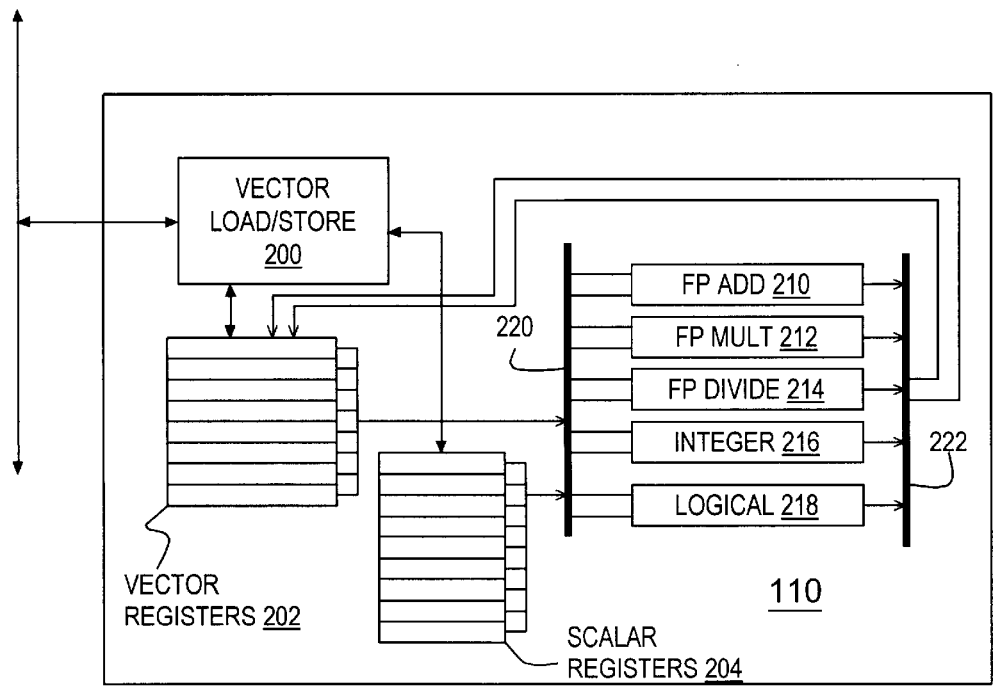
FIG. 2 is a block diagram illustrating additional detail of an attached processor of FIG. 1.

Referring to FIG. 2, additional detail of a vector processor embodiment of an attached processor 110 is illustrated. In the depicted embodiment, attached processor 110 includes a vector load/store unit 200 configured to retrieve vector information from and store vector information to main memory. Vector load/store unit 200 communicates with vector registers 202 where each vector register 202 typically includes a specified number of vector elements. Typically, each vector register 202 has multiple read ports in addition to a write port to permit a high degree of overlap among vector operations.

The depicted embodiment of attached processor 110 further includes logic suitable for performing one or more mathematical functions in the form of a set of vector functional units. The functional units depicted include a floating point add unit 210, a floating point multiply unit 212, a floating point divide unit 214, an integer unit 216, and a logical unit 218. Other embodiments of attached processor 110 may include more or fewer functional units depending upon the implementation. The vector register read ports are connected to the functional units via a first cross bar 220 while the write ports are connected to the functional unit via a second cross bar 222. The depicted embodiment of attached processor 110 further includes a set of scalar registers 204 that may provide input data to the vector functional units.

Returning to FIG. 1, each of the attached processors 110 of system 100 may provide substantially equivalent functionality to system 100. In one embodiment, the circuitry of each attached processor 110 is substantially identical. In this embodiment, system 100 includes a set of parallel and equivalent attached processors 110 that are used to improve the performance of system 100 for applications requiring extensive data calculation such as graphics intensive applications. In a typical embodiment, system 100 is implemented as an integrated circuit fabricated on a single semiconductor substrate. System 100 may include a set of eight or more parallel attached processors 110 to support CPU 102. In this embodiment, it will be appreciated that the collective die area consumed by the set of attached processors 110 may comprise a significant percentage of the total die area of system 100 Nevertheless, each of the individual attached processors 110 may account for only a relatively small percentage of the total die area. The set of attached processors 110 may account for 50% or more of the total die area whereas each individual attached processor may account for less than approximately 5% of the total die area.

System 100 as depicted in FIG. 1 further includes a redundant attached processor or simply redundant processor 112 that is connected to memory interface 104 via memory access bus 108 and is capable of direct memory access to system memory 106. In an embodiment in which each attached processor 110 is functionally equivalent to each other attached processor, the redundant processor 112 is preferably implemented as the functional equivalent of the attached processors 110. Because each attached processor 110 consumes relatively little of the total die area, incorporating a single additional redundant attached processor 112 may be achieved with a modest increase in die size. Because, however, the redundant attached processor is the functional equivalent of each of the attached processors 110, redundant processor 112 may be substituted for any one of the attached processors 110. Under the assumption that a significant percentage of devices fail for a single, randomly located defect, the addition of redundant attached processor 112 may provide a cost effective yield enhancement mechanism because the redundant element is capable of repairing any defect that occurs within in a relatively large area of the die.

Figure 3:
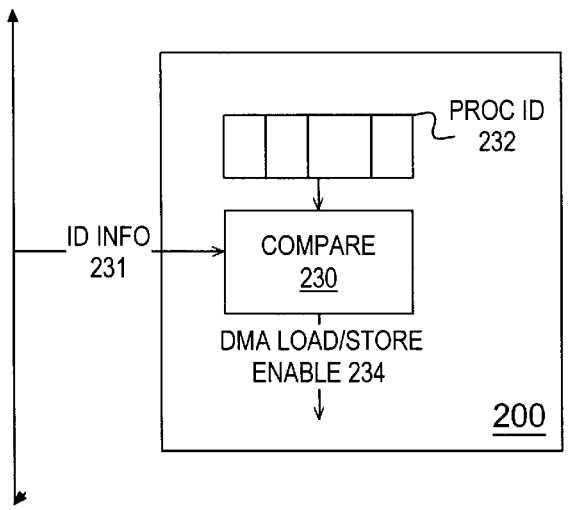
FIG. 3 is a block diagram illustrating additional detail of a load/store unit of the attached processor of FIG. 2.

Referring now to FIG. 3, additional detail of the vector load/store unit 200 of FIG. 2 is presented to illustrate one implementation of the contemplated redundancy mechanism. In the depicted embodiment, each attached processor 110 is associated with a unique attached processor identification (ID). The processor ID may be encoded in a processor ID register 232 within each attached processor 110. In the depicted embodiment, the contents of processor ID 232 are compared to processor ID information 231 provided with each DMA instruction. The ID information 231 is compared against the processor ID information 232 using suitable comparator circuitry 230 that is configured to assert a DMA load/store enable signal 234 if the ID information 231 matches the processor ID register 232. In this manner, each DMA transfer (i.e., DMA load or DMA transfer) command is executed only in the attached processor corresponding to a specified processor ID. Preferably, the processor ID register 232 in each of the attached processors 110 is programmable such that the processor ID of each attached processor 110 may be specified. The redundant processor 112 also includes a processor ID register 232 that is initially set to a null value. If, during the testing of system 100, a fault or failure is detected in one of the attached processors 110, the processor ID registers of the non-functional attached processor 110 and the redundant processor 112 may be reversed such that the redundant processor 112 becomes the attached processor associated with a particular processor ID. Other embodiments of system 100 may include a series of fuseable links that can be electrically or physically altered or destroyed to selectively disconnect the non-functional device while connecting the redundant processor 112.

Figure 4:
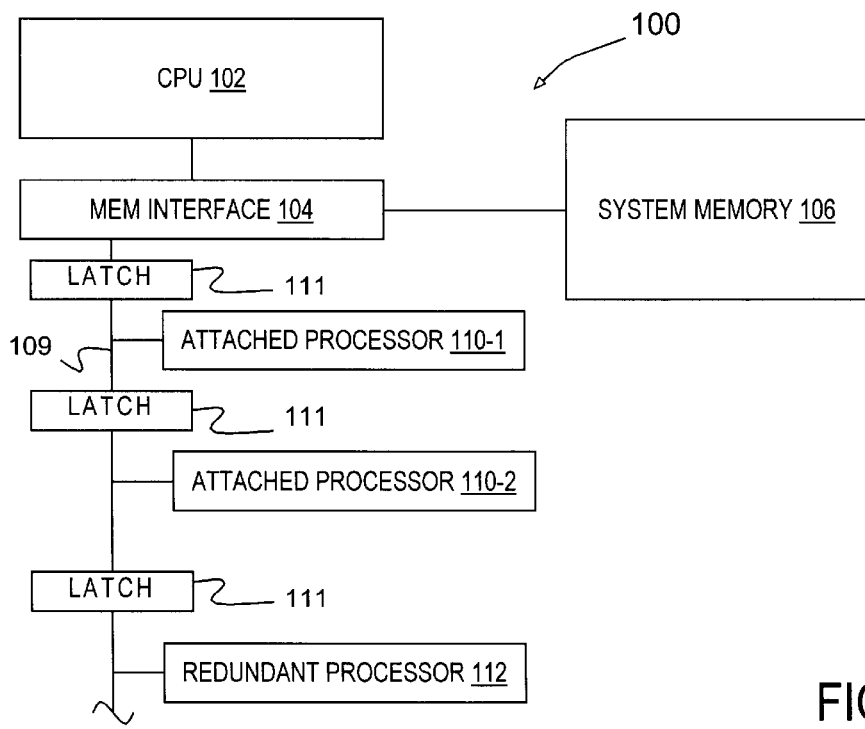
FIG. 4 is a block diagram of a data processing system according to one embodiment of the invention including a central processing unit and a set of attached processors.

An alternative embodiment of the invention is illustrated in FIG. 4, in which the attached processors 110 are connected to memory interface 104 via a pipelined memory access bus 109. In this embodiment, each attached processor 110 is connected to a different stage of pipelined bus 109 where the various stages are defined by a set of latches 111. The use of a pipelined bus 109 beneficially improves the speed (frequency) at which the bus may be operated. In the pipelined bus embodiment, the processor ID information preferably travels in parallel with the DMA data rather than being provided to each attached processor 110 as a sideband signal. In other words, it is preferable if the ID information encounters the same number of latches as the DMA data. This implementation is especially beneficial because memory controller 104 does not need to schedule DMA transfers according to which attached processor 110 is specified. Instead, memory controller 104 merely indicates a processor ID in parallel with the DMA data. When the data and ID information reach the appropriate stage (the stage containing the processor with an ID matching the processor ID information on the bus), the appropriate attached processor 110 will execute the DMA operation.

It will be apparent to those skilled in the art having the benefit of this disclosure that the present invention contemplates a processor having multiple support processors and a redundant support processor suitable for replacing one of the support processors. It is understood that the form of the invention shown and described in the detailed description and the drawings are to be taken merely as presently preferred examples. It is intended that the following claims be interpreted broadly to embrace all the variations of the preferred embodiments disclosed

What is claimed is:

1. An integrated circuit fabricated on a die comprising:
   a central processor on the die;
   a memory interface on the die connected to the central processor and connectable to a system memory;
   a set of attached processors on the die connected to the memory interface via a memory access bus and capable of accessing die system memory, wherein each of the attached processors is initially enabled to perform memory transfers, each of the attached processors is capable of being programmably disabled,
   a redundant processor connected to the memory access bus, wherein the redundant processor is functionally equivalent to at least one of the attached processors and wherein the redundant processor is initially disabled from performing memory transfers and wherein the redundant processor is capable of being programmably enabled when one of the attached processors is disabled such that the enabled redundant processor replaces the disabled attached processor
   the memory access bus is a pipelined bus including a plurality of stages, and each of the set of attached processors is connected to a stage of the pipelined bus.

2. The integrated circuit of claim 1, wherein each of the attached processors is associated with an ID, and further wherein the redundant processor is enabled to assume the ID of the disabled attached processor.

3. The integrated circuit of claim 2, wherein the attached processor ID's are stored in a programmable ID register of each attached processor.

4. The integrated circuit of claim 1, wherein each of the attached processors includes a load/store unit and logic for performing a mathematical function.

5. The integrated circuit of claim 1, wherein the redundant processor accounts for less than 5% of the integrated circuit die area.

6. The integrated circuit of claim 1, wherein the attached processors are connected in parallel to the memory interface via the memory access bus.

7. The integrated circuit of claim 1, wherein each of the attached processors is a vector processor capable of performing operations on an array of numbers responsive to a single instruction.

8. A data processing system including processing means connected to a system memory, wherein the processing means comprises:
   a central processor on a die;
   a memory interface on the die connected to the central processor and connectable to a system memory;
   a pipelined memory access bus connected to the memory interface and including a plurality of stages;
   a set of attached processors on the die wherein each of the set of attached processors is connected to a corresponding stage of the memory access bus and capable of directly accessing the system memory, wherein each of the attached processors is initially enabled to perform memory transfers and further wherein each of the attached processors is capable of being programmably disabled; and
   a redundant processor on the die connected to the memory access bus, wherein the redundant processor is functionally equivalent to at least one of the attached processors and wherein the redundant processor is initially disabled from performing memory transfers and wherein the redundant processor is capable of being programmably enabled when of the attached processors is disabled such that the enabled redundant processor replaces the disabled attached processor.

9. The data processing system of claim 8, wherein each of the attached processors is associated with an ID, and further wherein the redundant processor is enabled to assume the ID of the disabled attached processor.

10. The data processing system of claim 9, wherein the attached processor ID's are stored in a programmable ID register of each attached processor.

11. The data processing system of claim 9, wherein each of the attached processors includes a load/store unit and logic for performing a mathematical function.

12. The data processing system of claim 8, wherein the set of attached processors account for more than 50% of the integrated circuit die area.

13. The data processing system of claim 12, wherein the redundant processor accounts for less than 5% of the integrated circuit die area.

14. The data processing system of claim 8, wherein the set of attached processors are connected in parallel to the memory interface via the memory access bus.

15. The data processing system of claim 8, wherein each of the attached processors is a vector processor capable of performing operations on an array of numbers responsive to a single instruction.

16. A single chip data processing system comprising:
a central processor on a die connectable to a system memory via a memory interface;
a set of functionally equivalent vector processors on the die each connected to the memory interface via a memory access bus to provide vector processing functionality to the general purpose processor, wherein each of the vector processors is associated with a corresponding processor ID and further wherein each of the vector processors is configured to be programmably disabled from the memory access bus upon determining that the vector processor is faulty; and
a redundant processor on the die and connectable to the memory interface via the memory access bus, wherein the redundant vector processor is functionally equivalent to each of the set of vector processors and further wherein the redundant processor includes a programmable processor ID suitable for storing the processor ID of the faulty vector processor
the memory access bus comprises a pipelined bus including a set of stages defined by a corresponding set of latches and further wherein each of the vector processors is attached to a unique stage of the pipelined bus.

17. The system of claim 16, wherein each of the vector processors includes a vector load/store unit and logic for performing a mathematical function.

18. The system of claim 16, wherein the vector processors are connected to the memory access bus in parallel.

* * * * *